(12) United States Patent
Bullock et al.

(10) Patent No.: US 7,457,764 B1
(45) Date of Patent: Nov. 25, 2008

(54) SYSTEM AND METHOD FOR MATCHING HUMAN RESOURCES TO HUMAN RESOURCE NEEDS

(75) Inventors: John Bullock, Denver, CO (US); John Motler, Littleton, CO (US); John Miller, Lakewood, CO (US)

(73) Assignee: IQ Navigator, Denver, CO (US)

( * ) Notice: Subject to any disclaimer, the term of this patent is extended or adjusted under 35 U.S.C. 154(b) by 1650 days.

(21) Appl. No.: 10/042,731

(22) Filed: Dec. 21, 2000

Related U.S. Application Data

(60) Provisional application No. 60/180,421, filed on Feb. 4, 2000.

(51) Int. Cl.
*G06F 9/46* (2006.01)
(52) U.S. Cl. .......................................... 705/8
(58) Field of Classification Search ....................... 705/8
See application file for complete search history.

(56) References Cited

U.S. PATENT DOCUMENTS

| | | | |
|---|---|---|---|
| 5,884,270 A * | 3/1999 | Walker et al. ............... | 705/1 |
| 5,978,768 A * | 11/1999 | McGovern et al. ........... | 705/1 |
| 6,070,143 A * | 5/2000 | Barney et al. ................ | 705/8 |
| 6,266,659 B1 * | 7/2001 | Nadkarni .................... | 707/3 |
| 6,289,340 B1 * | 9/2001 | Puram et al. ................ | 707/5 |
| 6,370,510 B1 * | 4/2002 | McGovern et al. ........... | 705/1 |
| 6,385,620 B1 * | 5/2002 | Kurzius et al. ........... | 707/104.1 |
| 6,567,784 B2 * | 5/2003 | Bukow ....................... | 705/9 |
| 6,662,194 B1 * | 12/2003 | Joao ....................... | 707/104.1 |
| 6,915,269 B1 * | 7/2005 | Shapiro et al. .............. | 705/10 |
| 2001/0042000 A1 * | 11/2001 | Defoor, Jr. ................ | 705/9 |

OTHER PUBLICATIONS

Miller, Robert A., "Job Matching and Occupational Choice", The Journal of Political Economy, 1984.*

* cited by examiner

*Primary Examiner*—Jeffrey A. Smith
*Assistant Examiner*—Kalyan Deshpande
(74) *Attorney, Agent, or Firm*—Hogan & Hartson LLP (57) ABSTRACT

A system for matching entities having needs to entities having capability to meet the needs. A plurality of needs profiles are created, where each need profile comprises a data record specifying attributes about a need. A plurality of capability profiles are also created, where each capability profile comprises a data record specifying set of attributes of an entity having a capability of meeting a need. A matching engine is coupled to repetitively and automatically examine the needs profiles and capability profiles to identify matched profiles, wherein a match comprises a set of profiles judged to be substantially compatible based upon correspondence of the attributes specified therein.

20 Claims, 9 Drawing Sheets

BROWSER:General Resource Information

| First Name: | Last Name: | Title: | SSN |
|---|---|---|---|
| Elroy | Blues | Musician | 123-45-6789 |

| E-mail: | Daytime Phone | Evening Phone: | Status |
|---|---|---|---|
| Elroy | Blues | Musician | ⦿ Active  ◯ Inactive |

Resource Type: ☑ Contract ☑ Contract to Hire ☐ Direct Hire

Available to Interview As of:  Available to Start:

12/1/2000    12/1/2000

Geographic Preference    Referred By:

Chicago

Available Supplier Agents:          Managing Supplier Agent(s)

| Agent 1 | | Agent 1 |
| Agent 2 | >> | Agent 3 |
| Agent 3 | << | |

Skills/Roles Criteria

Please specify at least one skill and one role

| Skill 1 | Role 1 |
|---|---|
| Skill 1 | Role 1 |
| Skill 2 | Role 2 |
| Skill 3 | Role 3 |
| Skill 4 | Role 4 |

[ ADD SKILL ]    [ ADD ROLE ]

*FIG. 9*

| BROWSER:General Resource Information (Cont.) | | | | | |
|---|---|---|---|---|---|
| Skills/Role Detail | Level | Years Exp | Preference | Visibility | Delete |
| Skill 1 | Expert | 12 | Not Required ▷ | Protected ▷ | ☐ |
| Skill 2 | Novice | 1.5 | Required ▷ | Public ▷ | ☐ |
| Skill 4 | Trained | 1 | Required ▷ | Public ▷ | ☐ |
| Role 2 | Guru | 12 | Required ▷ | Public ▷ | |
| Role 4 | Expert | 12 | Not Required ▷ | Private ▷ | ☐ |

Resume: [ UPLOAD RESUME ]

Compensation:
| Hourly | 50.00 | Protected ▷ |
|---|---|---|
| Daily | | Private ▷ |
| Monthly | | Private ▷ |
| Annual | | Private ▷ |

Comment: [       ]

Other:

Job Consideration:   Preference:           Comment:
  Pager         ○ YES ● NO
  Overtime      ○ YES ● NO
  Travel        ○ YES ● NO
  Telecommute   ○ YES ● NO

FIG. 10

| | |
|---|---|
| OWNER:VALUE | VISIBILITY: PRIVATE |
| HIRING AGENT: VALUE | VISIBILITY: RESTRICTED |
| JOB TITLE: VALUE | VISIBILITY: UNRESTRICTED |
| SUMMARY: VALUE | VISIBILITY: UNRESTRICTED |
| POSITION: CONTRACT | VISIBILITY: UNRESTRICTED |
| LOCATION: VALUE | VISIBILITY: RESTRICTED |
| RESPONSE PERIOD:VALUE | VISIBILITY: UNRESTRICTED |
| REQ. SKILL: VALUE | VISIBILITY: UNRESTRICTED |
| DES. SKILL: VALUE | VISIBILITY: RESTRICTED |
| REQ. ROLE: VALUE | VISIBILITY: UNRESTRICTED |
| DES. ROLE: VALUE | VISIBILITY: RESTRICTED |
| COMPENSATION: VALUE | VISIBILITY: RESTRICTED |
| TARGETED SUPPLIER: VALUE | |
| OTHER: VALUE | |

| | |
|---|---|
| OWNER:VALUE | VISIBILITY: PRIVATE |
| APPLICANT: VALUE | VISIBILITY: RESTRICTED |
| SUMMARY: VALUE | VISIBILITY: UNRESTRICTED |
| POSITION: CONTRACT | VISIBILITY: UNRESTRICTED |
| LOCATION: VALUE | VISIBILITY: RESTRICTED |
| AVAILABLE DATE:VALUE | VISIBILITY: UNRESTRICTED |
| SKILL: VALUE | VISIBILITY: UNRESTRICTED |
| DES. TO USE SKILL: VALUE | VISIBILITY: RESTRICTED |
| ROLE: VALUE | VISIBILITY: UNRESTRICTED |
| COMP. RANGE: VALUE | VISIBILITY: RESTRICTED |
| TARGETED EMPLOYER: VALUE | |
| OTHER: VALUE | |

SYSTEM AND METHOD FOR MATCHING HUMAN RESOURCES TO HUMAN RESOURCE NEEDS

RELATED APPLICATIONS

The present invention claims priority to copending U.S. Provisional Patent application Ser. No. 60/180,421 entitled ELECTRONIC RESOURCE MANAGEMENT SYSTEM filed Feb. 4, 2000 the specification of which is incorporated herein by reference.

BACKGROUND OF THE INVENTION

1. Field of the Invention

The present invention relates, in general, to resource management, and, more particularly, to software, systems and methods for matching human resources to human resource needs of an organization.

2. Relevant Background

The world economy is characterized by a scarcity of skilled human resources for a variety of jobs. As the educational and experience requirements increase in a technological society, the pool of people having necessary and desired skills becomes smaller. This creates a situation in which many jobs are chasing fewer and fewer skilled workers. This is complicated in many industries, employees tend to move from job to job every few years. This is particularly true of skilled employees and even more particularly true in the information technologies industries. An advantage in identifying, obtaining and managing employees represents a significant strategic advantage for an organization.

It is increasingly difficult for employers to identify and hire qualified employees and contractors for particular positions. Human resource needs often arise suddenly and unpredictably, but must be filled quickly. With product development cycles and product life cycles becoming shorter, personnel with needed skills must be identified and hired quickly. At the same time, each candidate and position must be sufficiently analyzed to make meaningful decisions.

Job matching systems tend to be modeled after bulletin boards where available positions and/or applicants are posted and the other party must periodically peruse or search through the postings. This is inefficient because the participants are only made aware of other participants at the instant they conduct a search or log on. A new job applicant that registers moments after a search was performed will not be reported to the searching party, for example. Hence, participants must access the system frequently and conduct searches to obtain up-to-date information.

Search-based systems have limited ability to deal with the various words, terms and syntax used in the postings. A given job posting, for example, is amenable to a variety of expressions and it is difficult, even with natural language search engines, to effectively search through the various listings and leave with certainty that the most relevant matches have been found by the search engine. Many words and terms in the English language, when viewed in context, imply much more than the word's literal definition. Strict text-based matching used by search engines miss these implications. Even fuzzy matching, which is often based upon a word's syntax, synonyms, antonyms and the like, tend to miss complex meanings that are implied by simple words and the context in which they are used. For example, a job applicant may express that they have Java programming experience, which a typical search tool will match with job descriptions that call for Java experience. However, such experience implies that the applicant has object-oriented programming knowledge which would not be identified by conventional search engines and fuzzy matching techniques. A need exists for a system and method that overcomes the limitations of search-based systems to detect, imply, and deduce matches in a context-sensitive manner.

Another limitation of conventional systems is that even where an applicant's abilities and skills are accurately expressed, there is no way for the applicant to express a desire to use those skills in future employment. To retain workers it is desirable to find workers that are interested in the job and interested in the skills required by the job. For example, a person may be a skilled Cobol programmer, but uninterested in taking a position that uses those skills. Conventional worker identification systems do not consider worker interests and desires and so risk creating job matches that will be difficult to manage and maintain over time.

In-person job matching through conventional interviews and negotiation is inefficient, time consuming, and expensive. Also, it tends to be biased as the participants may express different needs and desires in an attempt to satisfy perceived requirements of the other party. This bias can result in sub-optimal matching of human resources to human resource needs.

A need also exists for systems and software that provide services beyond the identification and matching of potential candidates to job openings. Once a match is defined the life cycle of a typical hiring process continues through negotiations, travel, interviews, testing, and contracting among other steps. These steps are typically managed manually using lists or personal information management products. Hence, a need exists for providing follow-up on services to manage the hiring process in an integrated fashion.

SUMMARY OF THE INVENTION

Briefly stated, the present invention involves a system for matching entities having needs to entities having capability to meet the needs. A plurality of needs profiles are created, where each need profile comprises a data record specifying attributes about a need. A plurality of capability profiles are also created, where each capability profile comprises a data record specifying set of attributes of an entity having a capability of meeting a need. A matching engine is coupled to repetitively and automatically examine the needs profiles and capability profiles to identify matched profiles, wherein a match comprises a set of profiles judged to be substantially compatible based upon correspondence of the attributes specified therein.

DETAILED DESCRIPTION OF THE PREFERRED EMBODIMENTS

Figure 1:
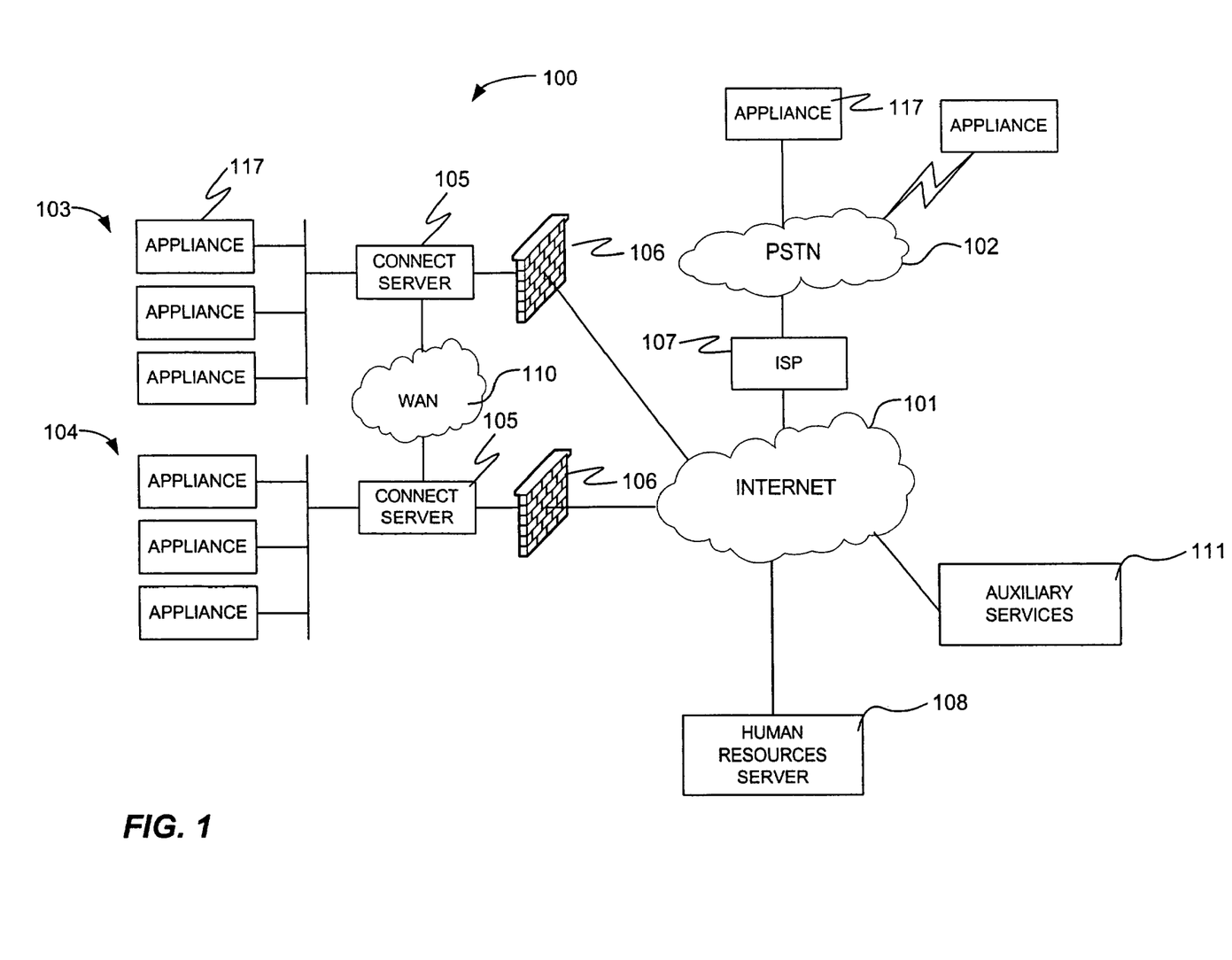
FIG. 1 shows a networked computer environment in which the present invention is implemented.

FIG. 1 shows an exemplary computing environment 100 in which the present invention may be implemented. Essentially, FIG. 1 illustrates a network populated by appliances coupled by various network interconnection devices including wide area networks (WANs) 110, local area networks (LANs), the public switched telephone network (PSTN) 102, public networks and the like. Environment 100 includes a plurality of local networks 103 and 104 that comprise, for example, Ethernet networks, FDDI networks, Token ring networks and the like.

Essentially, a number of computing devices and groups of devices are interconnected through a network 101. For example, local networks 103 and 104 are each coupled to network 101 through connect servers 105. LANs 103 and 104 may be implemented using any available topology and may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional WAN technologies.

Local networks 103 and 104 connect one or more computing devices such as computing appliances 117. One or more appliances 117 may be configured as an application and/or file server. Appliances 117 are used by job applicants, employers, "supplier agents" representing job applicants, and "hiring agents" representing employers to enter data, review data, and invoke services provided by human resources server 108. Each local network 103 and 104 may include a number of appliances 117 such as printers, file servers, mass storage and the like. Similarly, appliances 117 may be shared through network 101 to provide application and file services, directory services, printing, storage, and the like.

Environment 100 includes one or more network-connected human resources server(s) 108. Human resources server 108 may be accessed by participants using appliances 117. By way of example, human resources server 108 implements data structures and methods to accept job descriptions from hiring entities, store job descriptions, post job descriptions for access by potential applicants and other hiring entities and process employment inquires and acceptances. Other optional features may also be included in human resources server 108 including storage and display of auxiliary information such as contractor rate information by location and/or skills.

The present invention also contemplates the connection of one or more third party auxiliary service providers 111. Auxiliary services 111 comprise, for example, services to manage candidate background checks, reference checks, drug testing, and similar services that may add value or information to an exchange between participants. For example, a credit reporting agency may provide real time background information on a particular job applicant or potential employer. Because the information provided by auxiliary services 111 can be accessed in near real time, it may be readily factored into the total cost/benefit analysis of a particular exchange.

Human resources server 108 may also provide specialized services such as computation and comparison of employment offers and job descriptions using unique data that describes individual participants. Selecting employment from among a pool of available positions is a difficult decision involving many factors such as cost of relocation, salary, cost of living, commuting distance, and the like. Many of these factors are unique to a particular applicant. The optional specialized services in accordance with the present invention provide tools to compare diverse offers with consideration to applicant-specific preferences. Similarly, these specialized services assist in comparing applicants by taking into consideration relocation costs, employment agency costs, and other employer-specific factors that may differentiate between competing applicants.

Each of the devices shown in FIG. 1 may include memory, mass storage, and a degree of data processing capability sufficient to manage their connection to Internet 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage (not shown) that provides mass storage capacity beyond what an individual device can efficiently use and manage. Selected components of the present invention may be stored in or implemented in shared mass storage.

Figure 2:
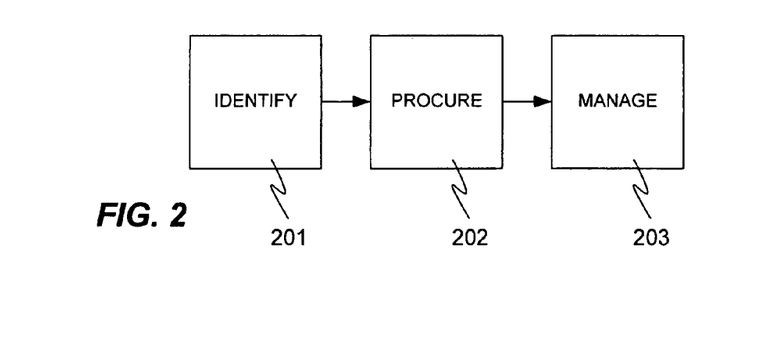
FIG. 2 shows basic business processes involved in an exemplary implementation of the present invention.
Figure 3:
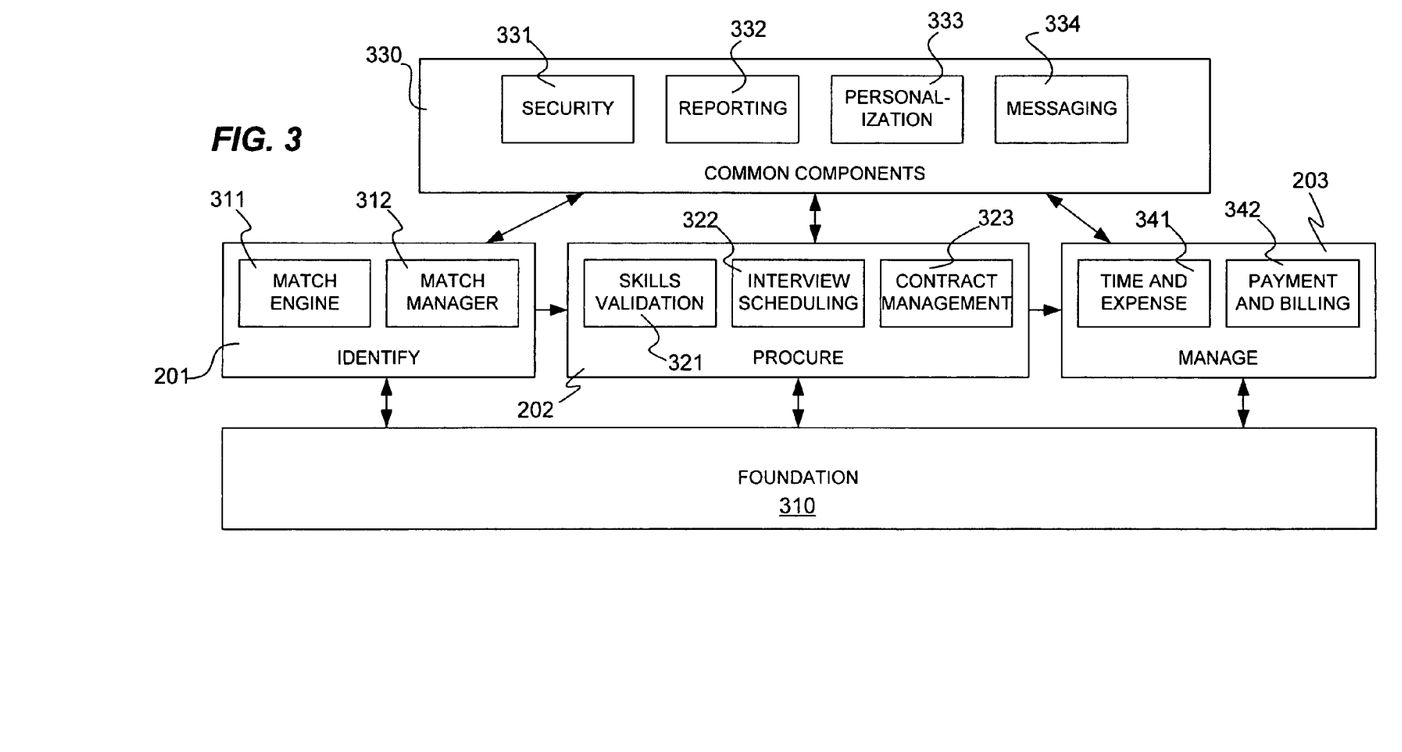
FIG. 3 shows a particular implementation of the present invention.

FIG. 2 illustrates basic business processes involved in an implementation of the present invention while FIG. 3 illustrates functional components in an exemplary software architecture in accordance with the present invention to implement the processes of FIG. 2. Essentially, the present invention provides an integrated solution for identifying workers having skills that meet job specifications in identification process 201. Identification process 201 also involves identification of jobs that have specifications meeting the desires and preferences of particular skilled workers. Process 201 includes matching engine processes 311 (shown in FIG. 3) for enabling a hiring manager to quickly identify a "short list" of qualified and available candidates for an available position. Process 201 provides functionality for hiring managers to efficiently post, edit and delete job descriptions. Once a match is created, match manager processes 312 automate the life cycle of the procurement process 202. It allows participants to automate the workflow of finding a qualified candidate as well as placing and managing that candidate in their organization.

Hiring managers may optionally submit job descriptions to a selected supplier list in process 201. Methods are included to enable hiring managers to manage interactions between the suppliers of the qualified applicants. Process 201 also provides equivalent functionality for the suppliers of candidates in posting, editing and deleting profiles or portfolios that are used to match against the job specifications. In a particular implementation, suppliers of resources automatically or manually match their candidates to jobs that they are made aware of via the Internet or by explicit notification.

While many features of the present invention involve identification process 201, it is important to understand that these processes affect downstream processes such as procurement processes 202 and management processes 203. Procurement processes 202 includes interview scheduling processes 322 and employs messaging processes 334 to enable an employer and a candidate to move beyond the generation of a match and discuss specifics of a job opportunity. Exemplary functions include exchanging protected information between the parties (including sending company information and contact information to the participants), reviewing a detailed profile of the candidate, scheduling interviews with the candidate, and capturing interviewer feedback on a candidate in an on-line repository.

Processes 202 optionally include skills validation process 321 including pre-employment screening processes to provide independent verification of skills that are listed on the candidate profile. It is contemplated that these optional functions may include scheduling on-line testing of available skills tests with the candidate, scheduling independent verification of specific skill categories with candidate, entering and/or reviewing test or verification results on-line, and interfacing with other repositories of skills certifications. Processes 202 may also provide a means to manage candidate background checks, reference checks, drug testing, and the like using, for example, auxiliary services 111.

Procurement process 202 provides interface(s) through which participants may perform contract management functions. Procurement process 202 optionally includes automated contract management components 323 (shown in FIG. 3) that are used when the employer and job seeker are ready to enter into a contract for services. Employers and job seekers may enter a new contract/consulting agreement or copy one from an existing template or archive. The participants may extend and/or approve contract offers on-line in a preferred implementation. In other implementations, participants may receive automatic notification of contract termination, perform contract reporting to compare budget to actual dollars, percentage completion analysis and the like. Directly or through auxiliary services, procurement processes 202 optionally perform compliance reporting (EEOC, MBE/MWBE).

The procurement processes are typically provided to contract participants which may be supplier agents and hiring agents working on behalf of employees and employers, respectively. It is contemplated that procurement processes 202 may be provided directly to employees and/or employers even though the identification processes were provided indirectly through their respective agents. These modification and alterations are equivalent to the processes described herein.

Optional management processes 203 implement various interfaces and processes that enable participants to manage an employment contract after it is formed. Management processes 203 are particularly desirable in contract employment situations where the employment contract specifies certain activities, billing arrangements, payment arrangements, and progress criteria. A time and expense management component 341 provides interfaces to the processes associated with consultant timesheets and expense reports as a particular example. Component 341 includes entering and submitting timesheets and expense reports associated with specific work orders, reviewing and approving consultant timesheets and expense reports, including partial approval capability and support for multi-level approval chains, and reporting time and expense by work order, consultant, supplier firm, and the like. An interface through which clients may approve consultant time and expense may also be provided.

Automated payment services and billing module 342 uses data captured through components such as time and expense component 341 to generate and track invoices to customers, and payment received from customers. The processes associated with invoicing and payment of services may be performed electronically, using technology such as XML and the OFS data interchange format either directly or through auxiliary services 111. Contemplated functions include generating electronic invoices based on time and expense report approval, consolidating multiple vendor/supply sources into a single invoice, cross-referencing invoices to timesheets/expense reports, approving electronic invoices, and allowing electronic transmission of funds based on approved invoices.

As shown in FIG. 3, in a particular implementation of the present invention business processes 201, 202 and 203 are implemented on top of foundation processes 310. Foundation processes 310 include components such as Enterprise Java Beans, Servlets, Oracle 8i relational database technology, Web Logic application servers connected together using industry standard APIs and protocols in a particular implementation. Using a Java 2 Enterprise Edition (J2EE) architecture enabled the present invention to be implemented using an application service provider (ASP) model that provides browser-based universal access for a wide range of user types, reducing operational management complexity and cost of ownership. The architecture shown in FIG. 3 leverages a software component model that gives flexibility in deploying, managing and reusing business logic and allows incremental development and deployment of application components. This implementation also permits integration with third party applications by wrapping logic using enterprise Java Bean technology. Moreover, the architecture shown in FIG. 3 enables a robust enterprise environment that provides a scalable, consistent architecture with 7×24 availability on the World Wide Web (WWW).

The J2EE standard provides a model for developing distributed applications that are multi-tiered and use a thin-client strategy. Such applications are desirable for delivery via the Internet to conventional web browser software. This implementation reduces demands on client-side systems and enables a wide variety of appliances 117 (shown in FIG. 1) to access the human resources services 108.

The application is partitioned both across tiers and across functional groups. Partitioning across tiers allows distributed deployment, robustness under load stress and hardware failures, and integration of disparate component technologies and legacy applications into an integrated whole. Partitioning across functional groups permits easy expansion of application functions, modification of existing functions, as well as separate, specialized deployment of different functional groups based on user demand or hardware optimizations.

Common application components 330 are leveraged across all of processes 201, 202 and 203. Personalization component 333 enables the look-and-feel provided to participants to be customized to match the appearance of client and/or vendor web-sites, allowing functionality to be seamlessly integrated into customer intranets and web sites. The sequence of operations performed during the hiring process may also be tailored to a particular customer. As nearly all aspects of the hiring process in accordance with the present invention are data-driven (as opposed to event driven), users may be given the capability to tailor the application to match their hiring process by providing them with the tools to safely and consistently define their own data driving the hiring process.

Management reporting component 332 augments reports from other components, by providing additional general management reporting capabilities using the valuable data assets within the system. Component 332 provides various general reports generated from the system's data. Contemplated report types include consultant performance rating, supplier efficiency rating, inactive supplier/consultant reporting, and customer-driven reporting of available public information. Desirably, the system will also provide the ability for users to create their own customized reports to enable them to turn their own data into valuable information.

Security component 331 enforces access controls on user data. A user may explicitly define who may view or edit data owned by the user, or act on messages generated for the user. Users may designate particular information (e.g., salary ranges) as confidential. User contact information is typically held confidential until explicitly released by the user.

In a particular implementation, the systems are protected against hostile network attack via a combination of FireWall-106 software and IP security services provided by the Internet service provider 107 that provides connectivity between Internet 101 and human resources server 108. Administrative access to systems is controlled via available remote access software.

Figure 4:
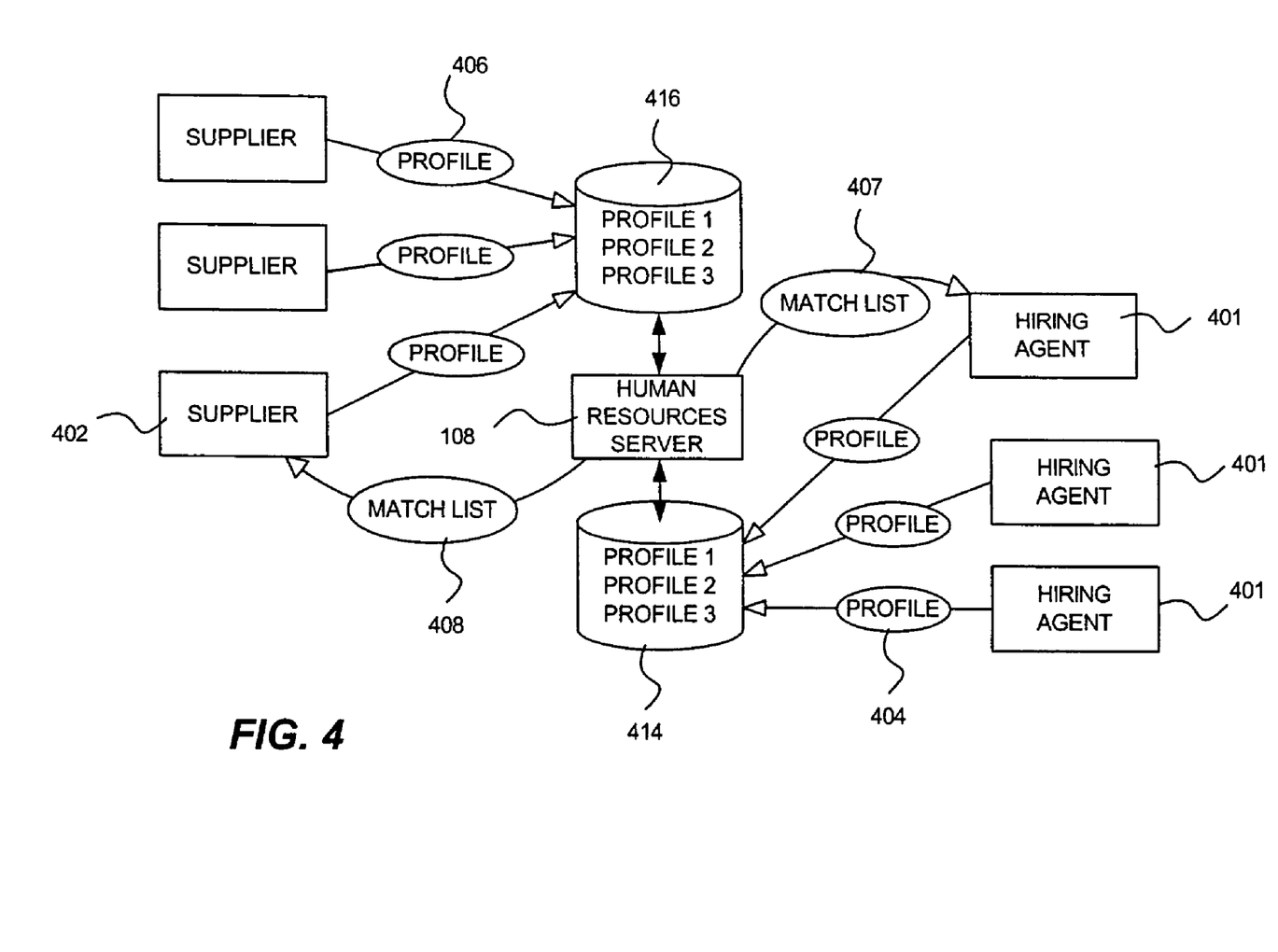
FIG. 4 illustrates exemplary entities and data transactions in an implementation of the present invention.

FIG. 4 illustrates exemplary entities and data transactions in an implementation of the present invention. Human resources server 108 enables transactions between hiring agents 401 and human resource suppliers 402. Hiring agents represent staffing agencies, human resource departments and personnel, and similar entities that are tasked with supplying human resources to meet the needs of one or more jobs. A hiring agent 401 may be an employer or an entity contracted to find skilled workers on behalf of an employer. Human resource suppliers 402 represent staffing agencies, job shops, headhunters and similar entities that represent one or more candidates or job applicants. It is contemplated that job applicants may access the system directly as well.

Figure 11:
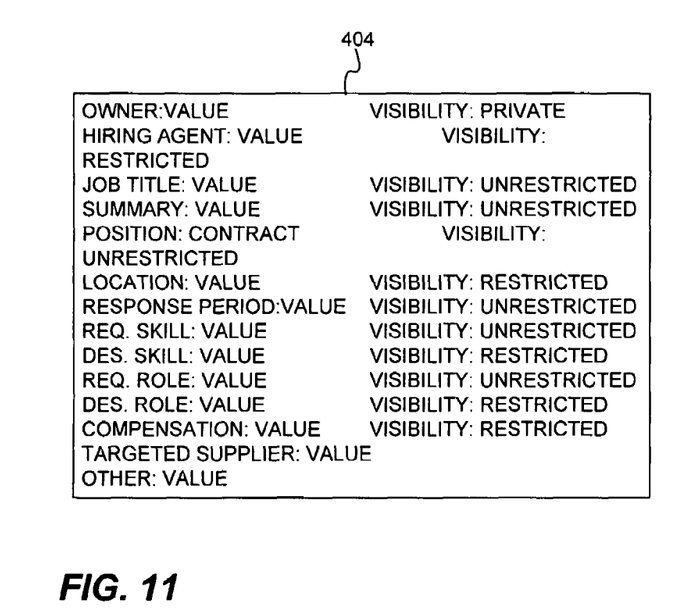
FIG. 11 and FIG. 12 illustrate profiles shown in FIG. 4 in greater detail.

Hiring agents 401 generate one or more profiles 404, shown in more detail in FIG. 11 that include attributes of job descriptions including information such as employer name, job title, salary, and other contract terms. Profile 404 will include some data that is public in that it can be shared with other participants with access to human resource server 108. Profile 404 also includes restricted and private data that can be used by human resource server 108 but is either not shared with other participants or is shared with other participants according to rules specified by the associated hiring agent 401. In this manner, profile 404 becomes an autonomous agent on behalf of the particular job represented by the profile 404 as it embodies self-contained rules enabling the use of data contained therein.

Figure 12:
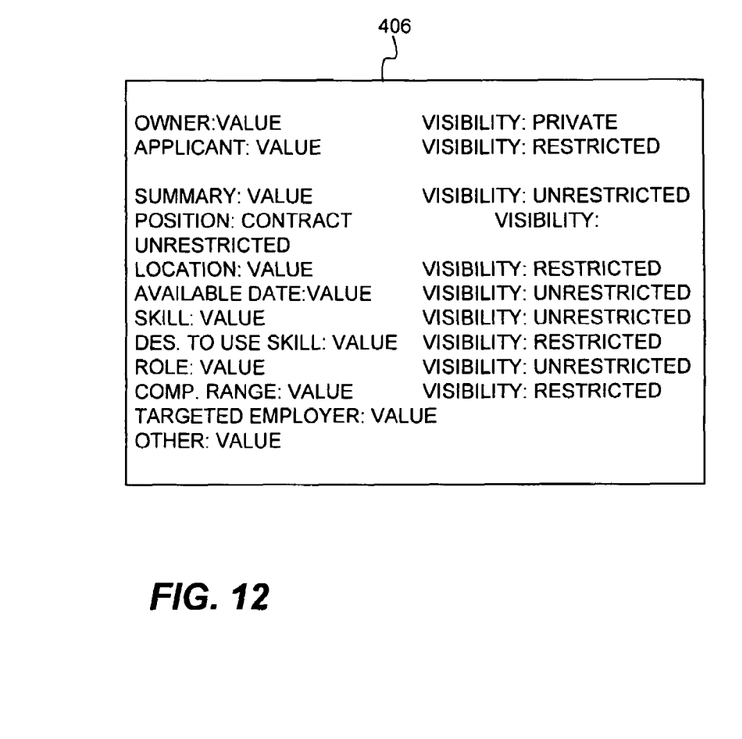

Supplier agents 402 also generate one or more profiles 406, shown in more detail in FIG. 12, that include attributes of particular job applicants including information such as name, location, experience, educational background, salary needs, and the like. Like profile 404, profile 406 will also include some data that is public as well as restricted and private data that can be used by human resource server 108 but is either not shared with other participants or is shared with other participants according to rules specified by the associated supplier agent 402. In this manner, profile 406 becomes an autonomous agent on behalf of the particular job candidate represented by the profile 406 as it embodies self-contained rules enabling the use of data contained therein.

Human resources server 108 uses messaging component 334 (shown in FIG. 3) to receive and store received profiles 404 and 406 in data structures 414 and 416, respectively, in a manner that is continuously accessible. Human resource server 108 uses match engine 311 to autonomously monitor data structures 414 and 416. In contrast with search engine based solutions, match engine 311 is self-invoked or is invoked automatically upon the addition of profiles 404 and/or 406 to identify matches between profiles 404 and 406.

Match engine 311 compares each job profile 404 against each job applicant profile 406 and generates one or more scores indicating a degree of compatibility between the profiles. Match engine 311 generates a match record for each profile match. The match record includes identification information associated with the matching profiles 404 and 406 as well as match scores. Each match record has two different scores, how well the candidate meets the job requirements (this score is available to both the hiring agent and the supplier agent and determines whether or not a match record is created (i.e. over the threshold). The other score is how the job meets the candidate's requirements. In the preferred implementation, this second score is only shown to the supplier agent).

Match engine 311 generates a match list 407 of candidates having profiles 406 that are substantially compatible (i.e., have match scores greater than a predetermined threshold) with a particular profile 404. The match list 407 includes the one or more scores for use by hiring agent 401 in assessing and comparing various candidates represented in the list. Match list 407 is communicated using messaging component 334 to the hiring agent 401 corresponding to the profile(s) 404 that are involved in the match.

Match engine 311 also generates one or more scores indicated a degree of compatibility of profiles 404 with a particular profile 406. These scores reflect how well a particular job matches the requirements specified by a job applicant. Although the scores delivered to hiring agent 401 and the scores delivered to supplier agent 402 arise from the same set of data, they may differ in value when the scoring algorithms take into account the differences in perspective between a hiring agent and a job applicant.

Match list 408 comprises job descriptions and match records having profiles 404 that are substantially compatible (i.e., have match scores greater than a predetermined threshold) with a particular profile 406. The match list 408 includes the one or more scores for use by supplier agent 402 in assessing and comparing various job descriptions represented in the list. Match list 408 is communicated using messaging component 334 to the supplier agent 402 corresponding to the profile(s) 406 that are involved in the match.

In the particular implementation, messaging component 334 is the primary interface for users when first connecting to human resources server 108. Through this interface a user is immediately informed of objects in the system upon which the user may take action. The messaging component 334 provides email message capability to send notification of events within the business workflow to provide real time hiring process management. These notifications are configurable for each user and can be related to or triggered by events, (e.g. a match is accepted by hiring agent 401) or to non-events (e.g. a hiring manager 401 accepted a match on a supplier's candidate but two days have elapsed since acceptance).

Messaging component 334 may also be used for more sophisticated delivery of discrete units of functionality to appliances 117 such as hand-held smart devices, such as personal digital assistants, smart cards and or smart phones. These discrete units of functionality (analogous to browser applets) may be executed on the hand-held device to interact with the systems of the present invention and perform operations such as accepting a match, submitting a time sheet, or approving an expense report.

Figure 5:
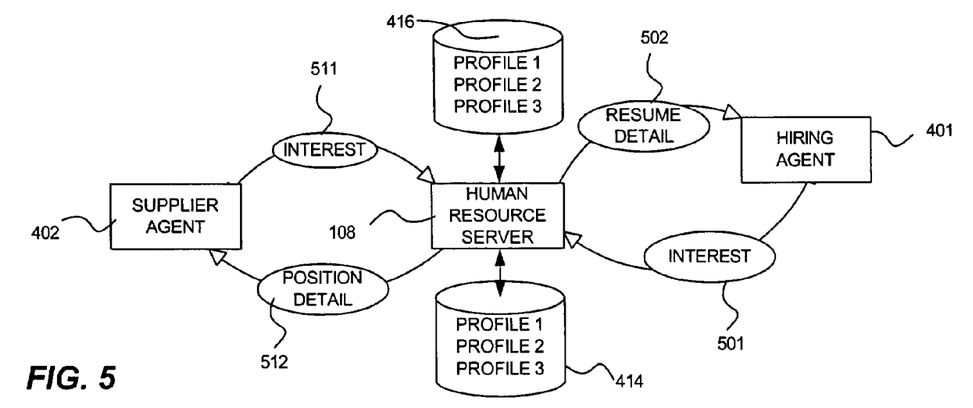
FIG. 5 illustrates activities of a match manager component of the present invention.
Figure 6:
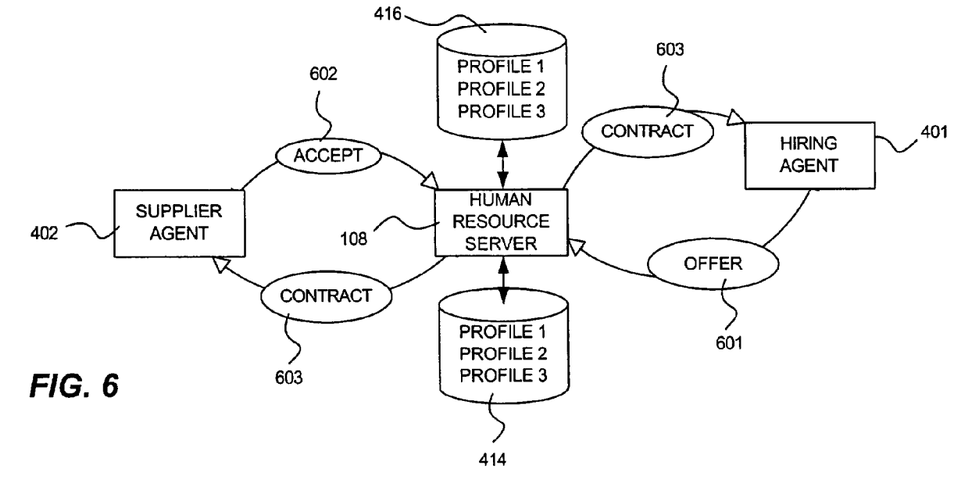
FIG. 6 illustrates data exchanges associated with an actual employment or consulting contract being formed.

Once one or more matches are identified, match manager component 312 handles workflow tasks such as generating match list 407 as well as further tasks shown in FIG. 5 and FIG. 6. A hiring agent 401 may review a match list and accept or express interest in one or more matches by generating a message 501 to server 108. Depending on the business rules in effect, match manager 312 may notify supplier agent 402 upon receipt of message 501, or take alternative action such as providing detailed information message 502. Message 502 includes, for example, information that may have been designated as restricted by the job applicant or supplier agent 402 and released only upon an expression of specific interest by a hiring agent 401. The exchange of messages 501 and 502 may continue iteratively as hiring agent 401 gathers additional information about a particular identified match.

On the supplier agent side, a match list 408 is reviewed and supplier agent 402 may also accept or express interest in one or more matches by generating a message 511 to server 108. Depending on the business rules in effect, match manager 312 may notify hiring agent 401 upon receipt of message 511, or take alternative action such as providing detailed information message 512. Message 512 includes, for example, information that may have been designated as restricted by the hiring agent 401 or employer and released only upon an expression of specific interest by an supplier agent 402. The exchange of messages 511 and 512 may continue iteratively as supplier agent 402 gathers additional information about a particular identified match.

FIG. 6 illustrates data exchanges associated with an actual employment or consulting contract being formed. Although FIG. 6 suggests the contract is between hiring agent 401 and supplier agent 402, it should be understood that it is intended that a contract is formed between a candidate employee or contractor and a corresponding employer and the respective agents only represent these parties. An offer message 601 is communicated by one of the parties, typically the hiring agent 401, to human resources server 108. The offer is communicated to the other party, typically supplier agent 402, which can then reject or accept the offer by an accept message 602. Once an offer message 601 and an accept message 602 have been communicated, a contract is formed. Contract message 603 is communicated to both parties, preferably including a contract summary or fully executed viewable/printable version of the engagement contract. In a particular example, human resource server 108 updates profiles within data stores 414 and 416 to indicate the effects of the contract (e.g., the position and candidate are no longer available for matching).

Figure 7:
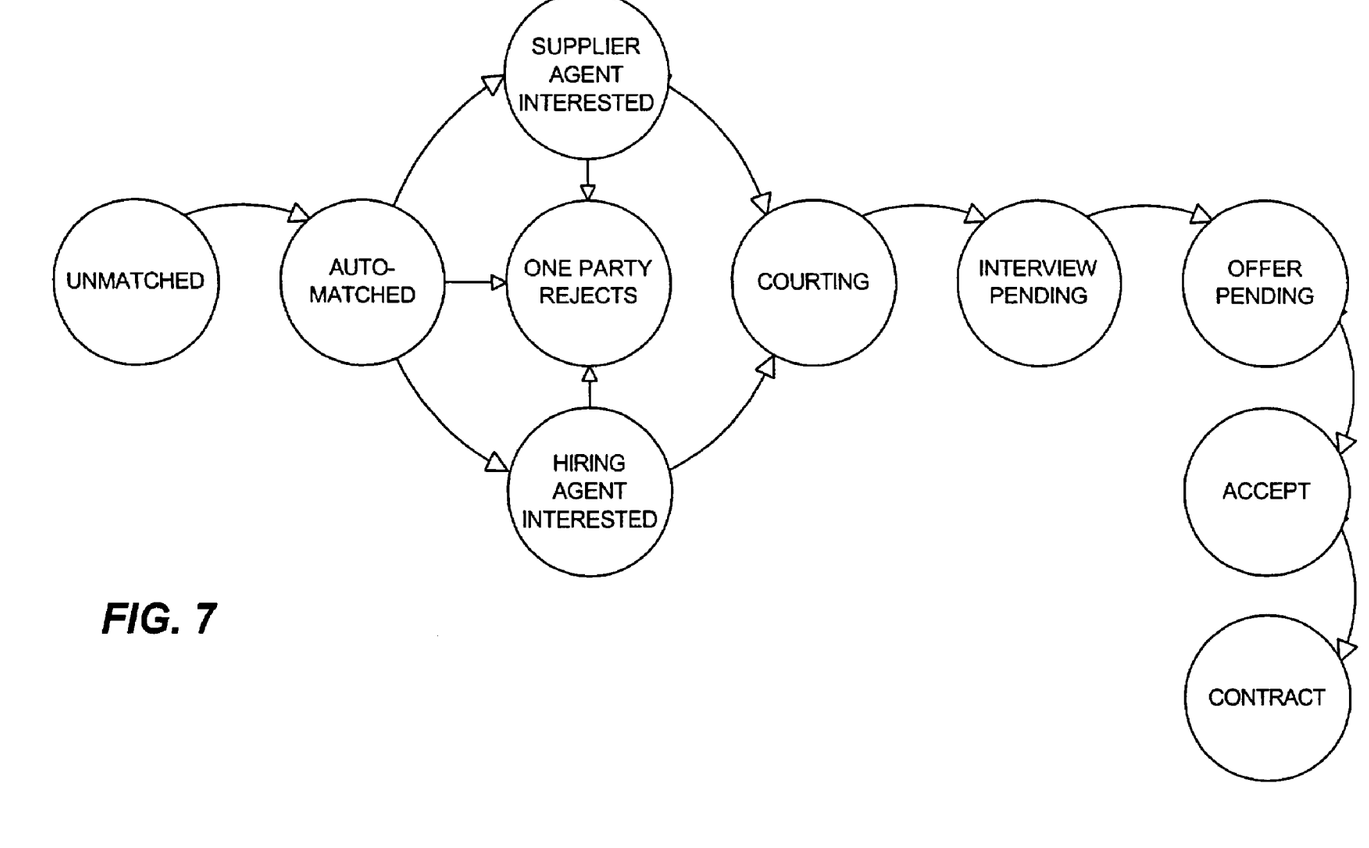
FIG. 7 shows exemplary state transitions involved in the matching and post match management processes in accordance with an embodiment of the present invention.

FIG. 7 shows exemplary state transitions involved in the matching and post match management processes in accordance with an embodiment of the present invention. Initially profiles exist in an unmatched state until a suitably compatible profile is identified by match engine 311. During the unmatched state, a job requisition will compare all candidate profiles that are "active" and are associated with a list of supplier agents specified within the job requisition. When a candidate profile meets the defined threshold, a match is identified, an automatch record is created, and the profiles are transitioned to an automatched state which indicates that the resource profile 406 is substantially compatible with an associated job specification profile 404.

Optionally, the auto-matched state may be entered manually when a supplier agent 402 or hiring agent 401 "forces" a match by bypassing the match engine processes. This enables a supplier agent 402 to generate a match record for a candidate that was either "inactive" or did not meet the scoring threshold. These candidates profiles still go through the match engine for scoring, but are not subject to the minimum threshold test ordinarily applied to automatches. Another optional feature enables a hiring agent to specify a named resource or candidate on the job requisition which will similarly force a match irrespective of the scoring and thresholds.

The automatch state is exited when either the supplier agent 402 or hiring agent 401 accept or reject the automatch. If either agent rejects the automatch, the hiring process is terminated. The process may be terminated as well when one agent responds, but the other does not, or when neither agent responds within a selected period of time. Both agents must accept the match to transition to a "courting" state.

The courting state indicates that both parties have indicated willingness to pursue the match. In the courting state, the parties may exchange the private information in accordance with pre-specified disclosure rules. Match manager component 312 tracks progress of various sub-processes that are optionally employed. The courting state includes one or more sub-states handling the various sub-processes. A match need not pass through all sub-states to make the transition to the interview pending state, and there is no order imposed on the transition between sub-states (i.e., the processes are concurrent). Exemplary sub-states of the courting state include background checking, reference checking, skill validation and the like. Background checking refers to background checks such as drug tests, criminal history checks, credit checks, BI/SBI, and the like. Reference checks involve contacting references identified by the job applicant, for example and may include checking on-line past-performance information maintained by human resource server 108 itself. Skill validation involves certifying any abilities for which hiring agent 401 has requested certification.

Upon satisfactory completion of courting state sub-processes, the match transitions to an interview state where in person, telephone, video conference or other interview processes are executed. Typically a job applicant is interviewed by one or more representatives of hiring agent 401 or the actual employer represented by hiring agent 401.

The interview state is typically exited by communication of an offer to a job applicant at which time the offer pending state is entered. The offer pending state may persist for a variable length of time while an offer is considered and counteroffers and negotiations take place. Upon reaching an agreement, an acceptance is communicated resulting in a transition to a contracted or closed state.

Figure 8:
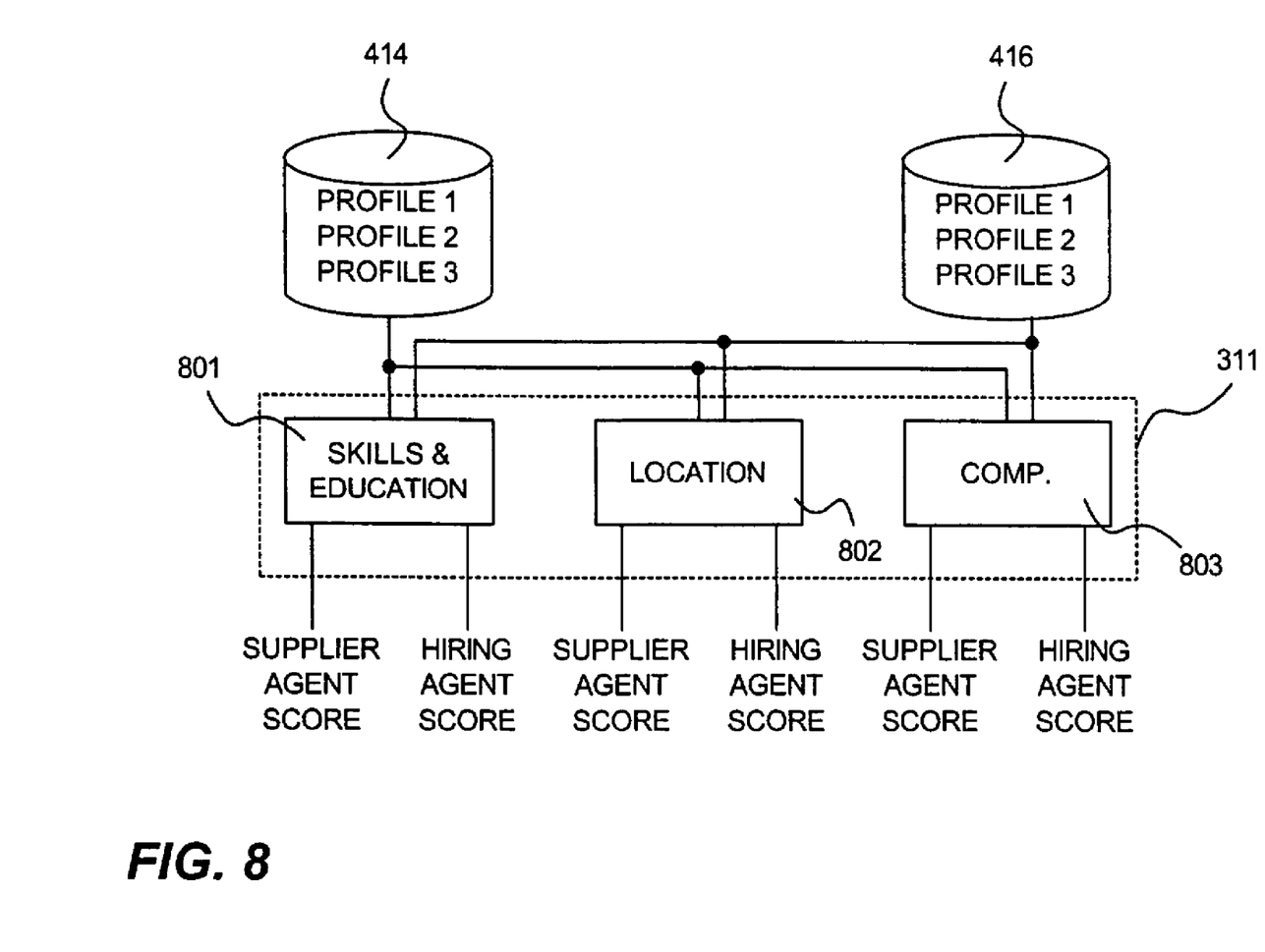
FIG. 8 illustrates functional components, typically implemented as software, within an exemplary matching engine.

FIG. 8 illustrates functional components, typically implemented as software, within an exemplary matching engine 311. In a particular implementation, three separate matching processes are performed to generate three distinct scores for each match. In each of the matching processes, data from profile databases 414 and 416 is used to generate scores for both the supplier agent 402 and the hiring agent 401. The matching processes generate a similarity index using the structured format of profiles 404 and 406 in combination with a hierarchical and context-sensitive analysis of words and terms used to create profiles 404 and 406. In this manner, the matching processes identify a larger set of meaningful matches and may be used in combination with available fuzzy logic matching techniques. Once a similarity index is determined, scores are computed by normalizing and weighting factors to the index.

The final scores are normalized to a convenient scale such as 1-100 that provides a quantitative assessment of the substantiality of the compatibility between two profiles. Skills and education component 801 matches skills requirements as well as educational requirements listed within profiles 404 and 406. Location component 802 generates a matching score on geographic preferences and/or requirements. Compensation component 803 generates a score based on compensation desires and requirements. While it is possible to mathematically combine these three scores into a single index using weighting algorithms, the particular implementation provides the scores separately so that the hiring agent 401 and/or supplier agent 402 have more information upon which to base their decisions and negotiations.

Figure 9:
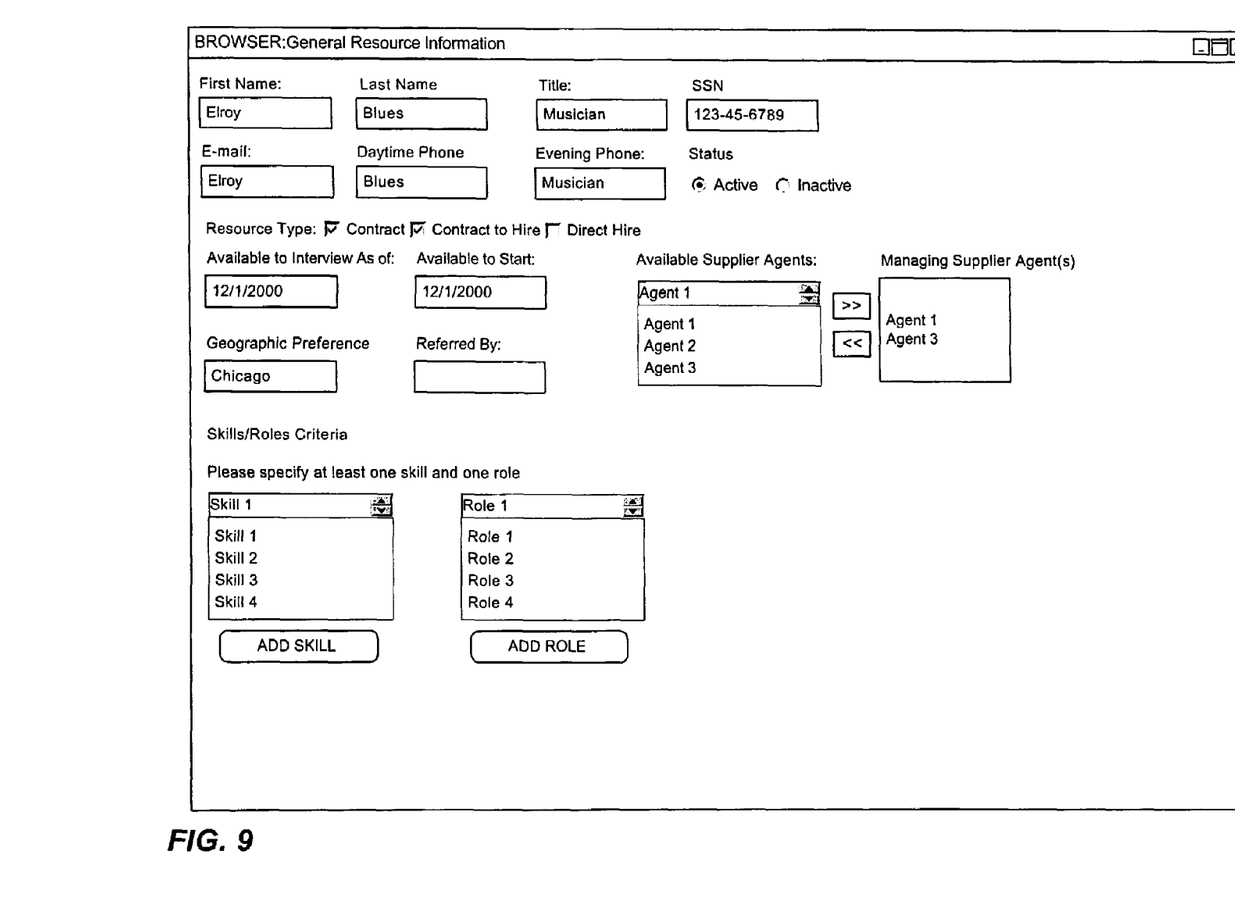
FIG. 9 and FIG. 10 show exemplary user interfaces used to enter job candidate information for use in a profile.
Figure 10:
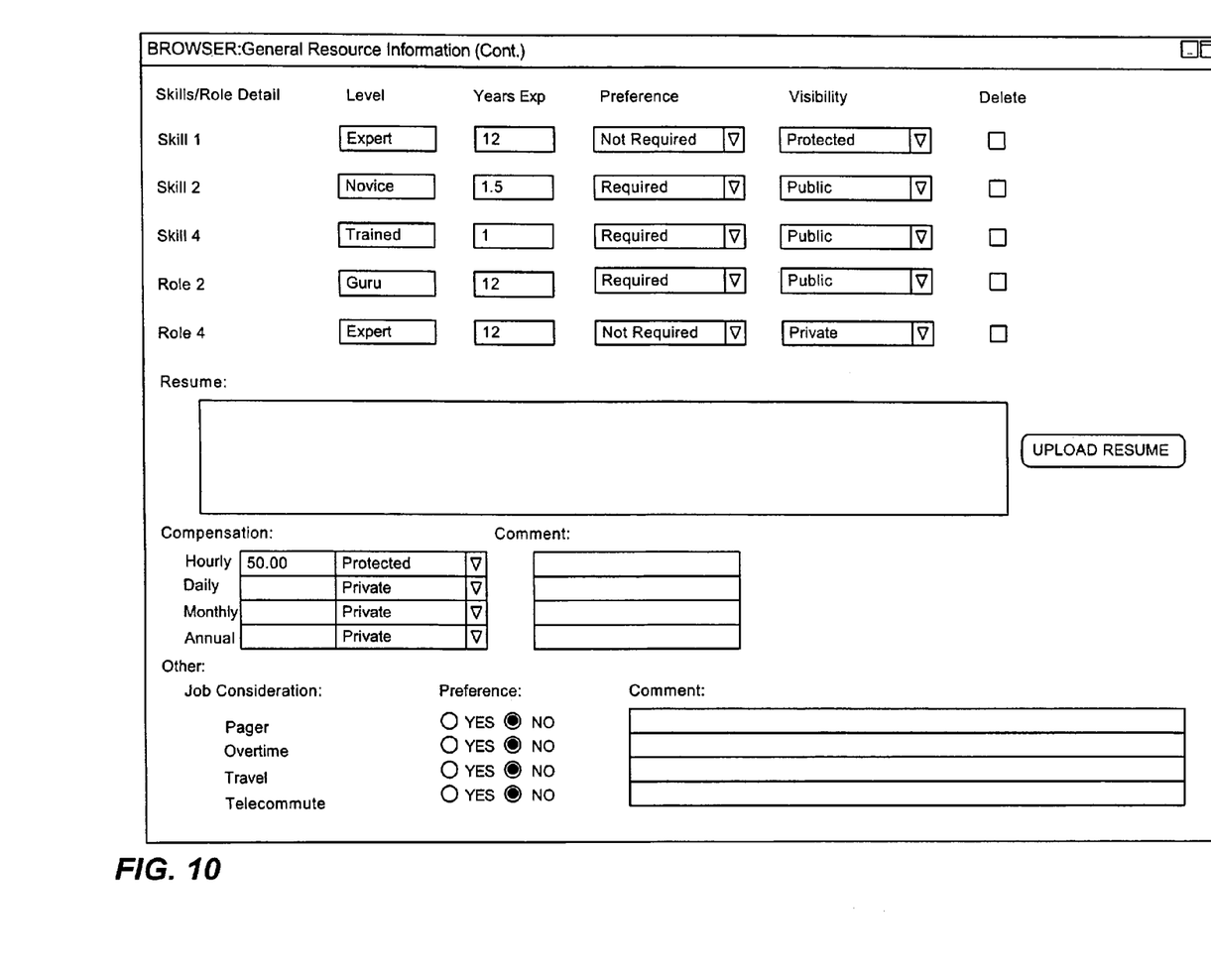

FIG. 9 and FIG. 10 show exemplary user interfaces used to enter job candidate information for use in a profile 406. Similar user interfaces are used to obtain hiring agent or job specification information. FIG. 9 and FIG. 10 shows an interface generated in a web browser window in a Microsoft Windows operating environment, although other operating environments and user interface platforms that can display user input controls, including command line input screens, would be appropriate substitutes in some applications. The interfaces shown in FIG. 9 and FIG. 10 include a plurality of user input controls such as text input boxes, radio buttons, check boxes, pull down boxes and the like. Information and instruction is conveyed by text fields positioned adjacent the appropriate user input controls although instruction may be conveyed by floating help boxes as well as audio, video and multimedia communication means. In FIG. 9 and FIG. 10 the user input controls correspond to attributes in a profile 406 that can be communicated to and persistently stored in human resources server 108.

In FIG. 9 the information that is gathered includes basic identification information such as name, job title, social security number, and contact information. Status information indicates weather the associated job applicant is actively seeking another position. Resource type information enables the user to distinguish between contract employees and permanent employees, for example. Other information is gathered for use in matching with job description profiles 404 such as availability dates and an indication of supplier agent(s) that are managing the particular job applicant.

In addition to the identification and management information, job applicant skills, education, roles, and preferences are indicated in various user input controls shown in FIG. 9 and FIG. 10. In FIG. 9, the user scrolls through a constrained list of skill titles and selects the "add skill" button to add the skill to the inventory list shown in FIG. 10. Similarly, the user selects from a constrained list of applicable roles and selects the "add role" control to include the role on the inventory list of FIG. 10. Once all applicable skills and roles have been identified, the interface shown in FIG. 10 is presented to obtain applicant-specific quantification of the skills and roles selected. An exemplary set of quantification information includes a judgment as to relative level of a particular skill (e.g., selected from "novice", "trained", "intermediate", "expert" and "guru" in the particular example). Any gradation and granularity of skills rating can be applied. Years of experience tends to be a numeric input that is constrained to reasonable year ranges (e.g., less than one year to 40 years).

One feature of the present invention is that preferably a "Preference" control is associated with each skill/role. This enables the job applicant to indicate whether he/she desires to use a particular skill in a future job assignment. Even where the skill or role is listed as "not required", match engine 311 can use the information provided to ensure better matches while appropriately reflecting the preference in the score given to the supply agent 402.

Another feature of the present invention is the ability to select visibility on an attribute-by-attribute basis. A particular attribute may be indicated as private, public, or protected in the particular example. Public variables will be available to a wide range of participants, whereas private variables may not be communicated to other participants (although still used by match engine 311). Private attributes may be communicated under very restrictive conditions in some implementations. Restricted attributes can be disclosed as specific states in the hiring process such as the "courting" state described in reference to FIG. 7.

Other information that may be included are a resume, and compensation information. These items may also be access-controlled by public, private and restrictive labels. Any type and variety of other information may be collected and stored in a profile 406.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for matching entities having needs to entities having capability to meet the needs, the system comprising:
   a plurality of needs profiles, wherein each need profile comprises a data record specifying attributes about a need;
   a plurality of capability profiles, wherein each capability profile comprises a data record specifying a set of attributes of an entity having a capability of meeting a need; and
   a matching engine coupled to repetitively and automatically examine the needs profiles and capability profiles to identify matched profiles and for each pair of matched profiles to determine a pair of scores indicating a compatibility of a particular match to each of the matched profiles, wherein a match comprises a set of profiles judged to be substantially compatible based upon correspondence of the attributes specified therein.

2. The system of claim 1 further comprising a notification message generated to first and second users associated with each profile in a particular one of the pairs of matched profiles, wherein the notification message comprises the match score associated with the particular one of the profiles with the two match scores being determined based on differing sets of matched attributes that are weighted independently by the first and second users.

3. The system of claim 2 wherein the notification message includes a selected subset of attributes from the matched profile(s).

4. The system of claim 3 further comprising:
   a response message generated by a recipient of a notification message; and
   a detailed notification message generated to the users associated with the matched profiles in response to receiving response messages from both users associated with a particular matched profile.

5. The system of claim 1 wherein the each need profile specifies attributes that describe a human resources need and each capability profile comprises attributes that describe skills of a job candidate.

6. The system of claim 5 wherein the job candidate attributes include attributes describing the associated candidate's qualifications.

7. The system of claim 5 wherein the job candidate attributes describe the associated candidate's desire to use particular skills in a future employment.

8. The system of claim 1 wherein the needs profile data record is persistent.

9. The system of claim 1 wherein the capability profile data record is persistent.

10. A job applicant agent comprising:
    a user interface for gathering information from a job applicant;
    a data record generated from the gathered information, the data record comprising a plurality of attributes describing skills of an associated job applicant, the data record being formatted for use in and continuously accessible by an external matching engine, wherein the data record further comprises attributes describing the associated job applicant's desire to utilize specified skills in future job assignments; and a network interface configured to communicate the data record to the external matching engine.

11. The applicant agent of claim 10 wherein the data record is formatted to enable the external matching engine to readily detect matches between the described skills and required skills of a hiring agent data record accessible by the matching engine.

12. A computer-implemented method for incrementally revealing information in a profile matching system comprising:

providing a plurality of profiles in memory of a computing device, each profile associated with a user and each profile comprising a set of attributes describing the associated user;

at least one restricted information section within a profile such that the profile can be accessed by the users accessing the computing device while the restricted information section remains protected from the accessing users;

automatically matching profiles based on correspondence of attributes specified in the profiles, including attributes within the restricted section;

with the computing device, presenting automatically matched profiles to the users associated with the profile in a manner that prevents exposing the restricted information section;

enabling each user that is presented with a matched profile to indicate further interest; and responsive to receiving indication of the further interest from all the users associated with a matched profile, presenting with the computing device detailed information including information in the restricted information section of a matched profile.

13. A method implemented by processes running on a human resources server for matching job applicants with hiring agents, the method comprising the acts of:

generating a plurality of needs profiles, wherein each needs profile comprises attributes about a need associated with a particular hiring agent;

storing the needs profiles as a data record in memory accessible by the human resources server;

generating a plurality of capability profiles, wherein each capability profile includes attributes of a job applicant;

storing the capabilities profiles as a data record in memory accessible by the human resources server;

repetitively and automatically matching the needs profiles and capability profiles to identify matched profiles, wherein a match comprises a set of profiles judged to be substantially compatible based upon correspondence of the attributes specified therein; and notifying a first user associated with one of the needs profiles and a second user associated with one of the capability profiles of the match, wherein the notifying comprises providing a degree of compatibility for the match to the first user and a degree of compatibility for the match to the second user.

14. The method of claim 13 wherein the act of notifying comprising presenting a selected subset of attributes from the matched profile to users associated with the matched profile.

15. The method of claim 14 further comprising:

responding to the notification with an indication of further interest in the identified match; and generating a detailed notification message to the users associated with the matched profiles in response to receiving response messages from both users associated with a particular matched profile.

16. The method of claim 13 wherein the act of generating a capability profile comprises including attributes within the capability profile that describe the associated user's desire to apply particular skills in a future employment.

17. The method of claim 12, wherein the users comprise job applicants or supplier agents and hiring agents or employers, wherein the profiles comprise profiles associated with the job applicants or supplier agents and profiles associated with the hiring agents or employers, and wherein the attributes in the restricted sections of the profiles associated with the applicants or supplier agents comprises attributes associated with the applicants and the restricted sections of the profiles associated with the hiring agents or employers comprises attributes associated with the employers.

18. The method of claim 13, wherein degrees of compatibility for the first and second users differ in value.

19. The method of claim 18, wherein the degrees of compatibility each comprise a score for a set of matching components.

20. The method of claim 19, wherein the first user comprises a particular one of the hiring agents and the second user comprises a particular one of the job applicants and wherein the set of matching components comprise components representative of skills and education, location, and compensation.

* * * * *